Feb. 14, 1939.                L. N. BRILLOUIN                2,147,189
                           LOADED ELECTRIC LINE
                           Filed Aug. 20, 1935              7 Sheets-Sheet 1

L. N. Brillouin
INVENTOR
By: Glascock Downing & Seebold
Attys.

Feb. 14, 1939.  L. N. BRILLOUIN  2,147,189
LOADED ELECTRIC LINE
Filed Aug. 20, 1935   7 Sheets-Sheet 2

L. N. Brillouin
INVENTOR
By: Glascock Downing & Seebold
Attys.

Feb. 14, 1939.  L. N. BRILLOUIN  2,147,189
LOADED ELECTRIC LINE
Filed Aug. 20, 1935  7 Sheets-Sheet 3

L. N. Brillouin
INVENTOR

By: Glascock Downing Seebold
ATTYS.

Feb. 14, 1939.                L. N. BRILLOUIN                2,147,189
                           LOADED ELECTRIC LINE
                           Filed Aug. 20, 1935            7 Sheets-Sheet 4

L. N. Brillouin
Inventor
By: Glascock Downing Seebold
Attys.

Feb. 14, 1939.  L. N. BRILLOUIN  2,147,189
LOADED ELECTRIC LINE
Filed Aug. 20, 1935  7 Sheets-Sheet 5

L. N. Brillouin
INVENTOR
By: Glascock Downing & Seebold
Attys.

Feb. 14, 1939.   L. N. BRILLOUIN   2,147,189
LOADED ELECTRIC LINE
Filed Aug. 20, 1935   7 Sheets-Sheet 7

L. N. Brillouin
INVENTOR

By: Glascock Downing & Seebold
Att'ys

Patented Feb. 14, 1939

2,147,189

UNITED STATES PATENT OFFICE 2,147,189

LOADED ELECTRIC LINE

Léon Nicolas Brillouin, Paris, France

Application August 20, 1935, Serial No. 37,061
In France August 2, 1935

5 Claims. (Cl. 178—44)

It is well known that electric lines loaded with inductance coils behave as a low-pass filter, viz: permit a free transmission for alternating currents the frequency of which is lower than a certain critical value, and practically stop the currents of a higher frequency.

Figure 1:
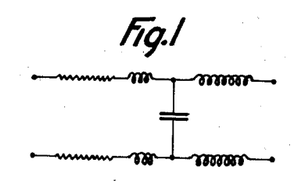
Figures 1 and 2 are corresponding figures of single and double wire lines.
Figure 2:
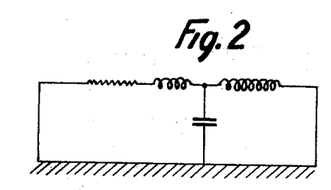

We may consider that such a line is constituted by a series of sections, all identical to each other, comprising a resistance and self inductance (that of the coil) located in the same point, and a resistance, a self inductance and a capacity uniformly distributed along the cable. It is known that in practice, for low frequencies, we may neglect the distribution of the electric characteristics of the cable therealong and compare the section to an inductance and a resistance connected in series, with a condenser in parallel; each section constituting thus a quadripole, that is to say, a network provided with two input and two output terminals if the line comprises two wires as represented in Fig. 1, and a dipole if the line comprises a single wire earthed at both ends as represented in Fig. 2; it is also known that the case of the quadripole may always be brought back to that of the dipole in order to simplify the calculations. Further, if we want only an approximation, generally sufficient in practice, we may neglect the resistance of the coils and take heed only of that of the cable; and also neglect the inductance of the cable and take heed only of that of the coils.

The present invention has for its object a line especially designed for telegraphic or telephonic communication comprising a plurality of sections all identical to one another, each of said sections constituting a complex impedance so determined that it might be possible to obtain not only a simple low frequency band but also bands in the range of the medium and high frequencies, which may be used for transmitting telegraphic or telephonic signals. The separation of the waves of the different frequencies can be made at the end of the line by filters and sometimes by other means which shall be disclosed further. It is moreover obvious that the line may be provided with repeaters each of which shall be used for one or more of the transmitting or carrying waves.

It shall be also possible, without attempting to use high frequency bands, to improve the ordinary transmission on a loaded line by substituting complex impedances to the so-called Pupin's coils, which shall allow to obtain in the low frequency range a more regular transmission.

Referring to the drawings:

Figure 25 shows another form of dipole, Figure 26 its curve of impedance and Figure 27 the distribution of bands in a line loaded therewith.

As said above a cable according to the invention comprises a plurality of sections all identical to one another, each being constituted by a series of impedance elements not always alike to one another, some of which are constituted by parts of cable the others consisting in complex impedances inserted between said parts of cable as the ordinary inductance coils.

A particularly simple form of execution consists in constituting each section by a cable loaded with inductance coils which are unequally spaced from one another.

Figure 3:
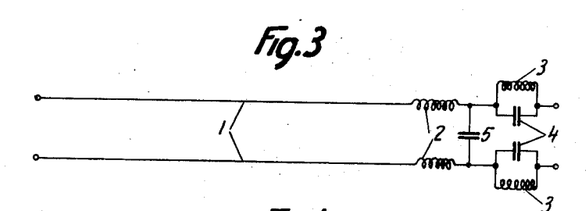
Figure 3 shows a form of line with complex loading and Figure 4 a lumped circuit equivalent thereto.

In another way, Fig. 3 illustrates a section constituted by a part of cable 1 loaded at one of its ends by a complex impedance comprising two inductance coils 2, 3 connected in series and one of which is shunted by a condenser 4, another condenser 5 being mounted in parallel between the wires.

Now I will give examples of calculation at first applied to the case when the passing bands correspond to rather low frequencies; in such a case it shall be sufficient to substitute elements L, R, C (inductance, resistance, capacity) to the parts of cable without taking heed of the distribution of said electric characteristics along the cable.

For the bands of high frequency such a method is not sufficient and it is necessary to take heed of the peculiar features of the parts of line in each section. Examples of calculation in this latter case shall be given a little further, they show that said parts of line play a very peculiar role and produce passing bands in the high frequencies range. According to the invention it is possible to determine these impedances in such a way that said bands might be used for telephony.

Figure 4:
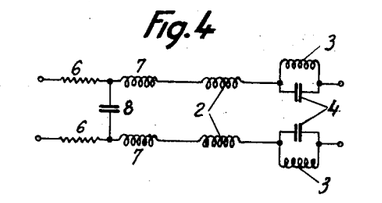

For low frequencies, for which it is useless to take heed of the distribution of the resistance, inductance and capacity along the line, a section like that of Fig. 3 may be represented by the diagram of Fig. 4 in this latter 6, 7 and 8 represent the total resistance, inductance and capacity of the part of cable 1.

Figure 5:
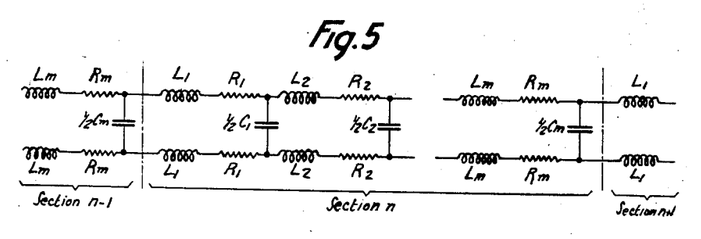
Figure 5 shows a general form of line according to the invention.

By way of example of the calculation of the passing bands, I will take at first a line each section of which is constituted, as diagrammatically shown on Fig. 5, by impedances connected to one another and constituted by an inductance L in series with a resistance R, a capacity C being mounted in parallel; some of these quantities L, R or C may be zero or infinite. One at least of the impedances represents a part of the cable.

Particularly simple forms of execution of such a section are the following ones.

If we assume $R_1=R_2$ ... and also $L_1=L_2$ ... and $C_1=C_2$ ... we have an ordinary loaded line.

If we assure $L_1=L_2$ ... and $$\frac{R_1}{C_1}=\frac{R_2}{C_2} \ldots$$

we have the section loaded with unequally spaced coils.

Figure 6:
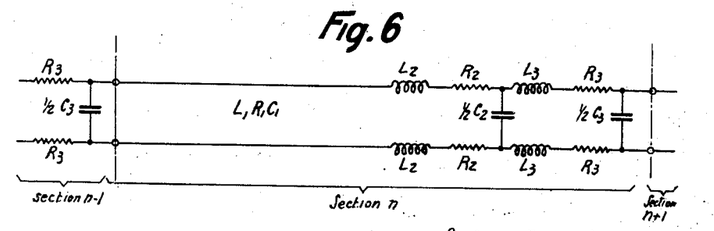
Figure 6 shows a section of the line according to Figure 5.

I could also constitute each section with a part of line 1 at the end of which is disposed a quadripole as shown in Fig. 6.

Figure 7:
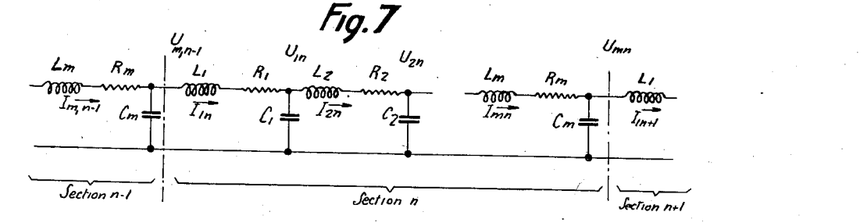
Figure 7 shows a single wire line equivalent to that of Figure 5.

It is moreover well known that, for the calculation, it is possible to consider the single wire line of Fig. 7 instead of the double wire line of Figures 5 and 6.

Figure 8:
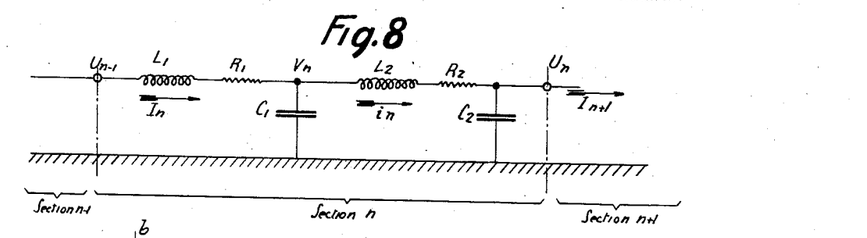
Figure 8 shows a section of a simple form of line according to the invention.

Before examining the general case I will examine a very simple one, wherein the section comprises only two impedances, what, in practice corresponds to a part of cable the resistance inductance and capacity of which are $R_1L_1C_1$, loaded at its end with the impedance $R_2L_2C_2$. As indicated in Figure 8, I will call $U_{n-1}$ and $U_n$ the potentials at the ends of the section and $V_n$ the potential at the point where the impedances are connected together, $I_n$ the current in the first impedance and $i_n$ in the second one, the pulsation ($2\pi f$) being $w$.

I have then the equation (1) $\begin{cases}(jL_1w+R_1)I_n=U_{n-1}-V_n \\ (jL_2w+R_2)i_n=V_n-U_n\end{cases}$ with $j=\sqrt{-1}$ (2) $\begin{cases}V_n=-\dfrac{j}{C_1w}(I_n-i_n) \\ U_n=-\dfrac{j}{C_2w}(i_n-I_{n+1})\end{cases}$ By substituting in (1) the values of $V_n$ and $U_n$ given by (2), I obtain two equations in $I_n$ and $i_n$ (3) $\begin{cases}\left(jL_1w+R_1-\dfrac{j}{C_1w}-\dfrac{j}{C_2w}\right)I_n=-\dfrac{j}{C_2w}i_{n-1}-\dfrac{j}{C_1w}i_n \\ \left(jL_2w+R_2-\dfrac{j}{C_1w}-\dfrac{j}{C_2w}\right)i_n=-\dfrac{j}{C_2w}I_{n+1}-\dfrac{j}{C_1w}I_n\end{cases}$ But it is known that when we pass from one section to the next one the currents are multiplied by a coefficient $f$ to which may be given the form of $e^k$ I may thus write:

(4) $\begin{cases}i_n=ie^{kn}=if^n \\ I_n=Ie^{kn}=If^n\end{cases}$ $k$ shall be positive or negative according to the direction on which travel the waves:

If $k$ is an imaginary expression the current, during the propagation, shall not be attenuated, but the phase shall vary progressively along the line.

If $k$ is a complex expression comprising a real part, an attenuation shall take place during said propagation.

If in Equation (3) I put in place of I and i their values as given by Equations (4) and if I multiply by $jw$, I will obtain (5) $\begin{cases}\left(-L_1w^2+\dfrac{1}{C_1}+\dfrac{1}{C_2}+jwR_1\right)I=i\left[\dfrac{f^{-1}}{C_2}+\dfrac{1}{C_1}\right] \\ \left(-L_2w^2+\dfrac{1}{C_1}+\dfrac{1}{C_2}+jwR_2\right)i=I\left[\dfrac{f}{C_2}+\dfrac{1}{C_1}\right]\end{cases}$ By multiplying the one by the other these two last equations I obtain the following quadratic equation in $f$:

(6) $(-L_1w^2+jwR_1)(-L_2w^2+jwR_2)$
$+\left(\dfrac{1}{C_1}+\dfrac{1}{C_2}\right)[-(L_1+L_2)w^2+jw(R_1+R_2)]+$
$\dfrac{1}{C_1C_2}[2-f-f^{-1}]=0$ but since $f=e^k$ the last term may be written:

$$\frac{2}{C_1C_2}(1-\cosh k) \text{ or } -\frac{4}{C_1C_2}\left(\sinh\frac{k}{2}\right)^2$$

The passing bands are not easily seen, since, because of the resistances there is an attenuation and $k$ presents a real term; if by way of first approximation it is assumed that resistances may be neglected, Equation (6) becomes:

(7) $L_1L_2C_1C_2w^4-(L_1+L_2)(C_1+C_2)w^2$
$-4\left(\sinh\dfrac{k}{2}\right)^2=0$ For obtaining a passing band it is necessary that $k$ be an imaginary expression such as $k=jb$ and Equation (7) becomes $$L_1L_2C_1C_2w^4-(L_1+L_2)(C_1+C_2)w^2+4\sin^2\frac{b}{2}=0$$

There is a solution only if $$\sin^2\frac{b}{2}$$

is comprised between 0 and $+1$. It is easy to determine between $-\pi$ and $+\pi$ how $b$ varies; these variations of $b$ are represented against those of $w$ by the curve of Fig. 9 plotted with $b$ as ordinates and $w$ as abcissae, and wherein the values of $w_1$ $w_2$, $w_3$ are respectively $$\left.\begin{array}{l}w_1^2\\w_2^2\end{array}\right\} = \frac{(L_1+L_2)(C_1+C_2) \pm \sqrt{(L_1+L_2)^2(C_1+C_2)^2 - 16L_1L_2C_1C_2}}{2L_1L_2C_1C_2}$$

$$w_3^2 = \frac{(L_1+L_2)(C_1+C_2)}{L_1L_2C_1C_2}$$

Figure 9:
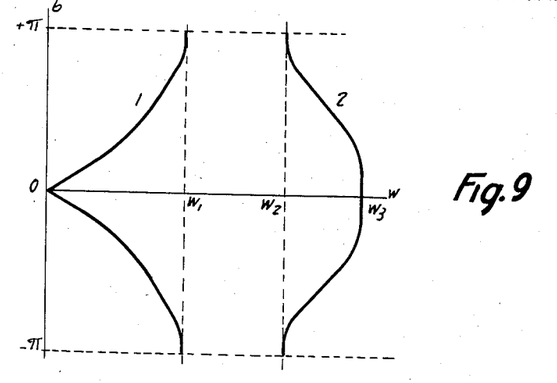
Figure 9 is a diagram illustrating the distribution of bands of free transmission in a line according to Figure 8.

It is obvious by examining the curve of Fig. 9 that $b$ is a real quantity on one hand between $o$ and $w$, and on the other hand between $w_2$ and $w_3$; therefore for the pulsations comprised between said limits $k$ is an imaginary expression which corresponds, as said above, to passing bands, thus we will have two passing bands: at first a low frequency one comprised between $o$ and $w_1$, and further a higher frequency one between $w_2$ and $w_3$; for the other values of the pulsations, say those comprised between $w_1$ and $w_2$, $b$ is an imaginary expression, $k$ is real and we have an attenuation preventing the free transmission.

If both inductances were equal to each other or $L_1=L_2=L$ and supposing $C_2<C_1$ we should have $$w_1^2 = \frac{2}{LC_1} \qquad w_2^2 = \frac{2}{LC_2} \qquad w_3^2 = \frac{2}{LC_2}\left(1+\frac{C_2}{C_1}\right)$$

Figure 10:
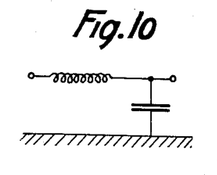
Figure 10 shows the equivalent loading of said line.

In said case the passing band has the same width as that of a wave filter constituted by elements as shown in Fig. 10; in said band the velocity of propagation is given by the initial slope of curve 9

$$W = \frac{w}{b}$$

if $w$ is very small $$W = \frac{1}{\sqrt{2L(C_1+C_2)}}$$

and the width of the high frequency passing band depends on the ratio $$\frac{C_1}{C_2}$$

If the calculation is made more exactly, viz: without neglecting the resistances it may be seen that in the middle of the high frequency passing band the attenuation is substantially the same as that of the low frequencies; therefore said high frequency passing band may be used for long distance communications.

It may be also seen that in the low frequency band the currents $I$ and $i$ are almost in phase while they are in opposition in the high frequency band.

For $w=0$, in the first Equation (5) where $R_1$ and $R_2$ are assumed to be 0 we have $$I\left(\frac{1}{C_1}+\frac{1}{C_2}\right) = i\left(\frac{f^{-1}}{C_2}+\frac{1}{C_1}\right)$$

therefore since $f=e^{jb}$ and $b=0$ $I=i$ so for $w=0$ the currents are in phase; it could be seen in a similar way that they are in opposition for $w=w_3$.

Figure 11:
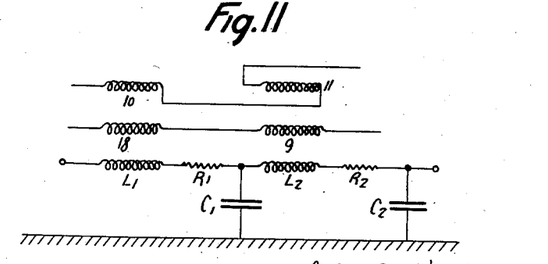
Figure 11 shows a device for separating the currents of the different bands with the line shown in Figure 8.

In said conditions, it shall be easy to separate the two currents without using any wave filter. As shown in Fig. 11 the inductance coils $L_1$ and $L_2$ of the last section, are coupled with windings 18 and 9 directly connected together; a current proportional to $I+i$ shall be then produced in said windings, consequently the current of the high frequency band which are in opposition shall produce substantially no effect in windings 18 and 9, in which a current shall be produced only by the current of the low frequency band; in order to receive the currents in the high frequency band two windings 10—11 connected in opposition may be employed.

If there was a mutual induction between the inductances $L_1$ and $L_2$ it is obvious that the difference in the phase of the currents should take a very great importance, since it should be necessary in the calculation to use in place of $L_1+L_2$ the expression $L_1+L_2+M$ or $L_1+L_2-M$.

Figure 12:
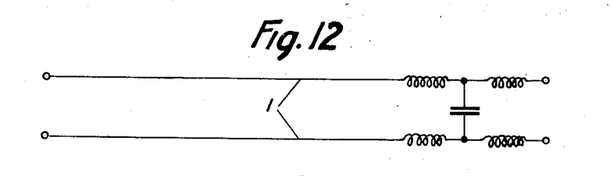
Figure 12 shows a form of execution of a double wire line equivalent to that of Figure 8.

Practical forms of execution of the section which has been examined could be the following ones:

1. Loading coils of two different types, with unequal inductances, are located alternately on the line, at the same distances from each other.
2. Loading coils with equal or unequal inductances are located on the line alternately at different distances from each other.
3. Every section is constituted by a certain length of line 1, and at the end of said line a complex impedance as shown on Fig. 12.

After that very simple example especially disclosed in order to show the existence of the passing bands, I will examine more exactly the general device illustrated in Fig. 7. Let $I_{hn}$ and $U_{hn}$ be the currents and potentials at the different connecting points of the section $n$, I shall have:

$$(8) \quad \begin{cases} L_1\frac{d}{dt}I_{1n} + R_1I_{1n} = U_{m,\,n-1} - U_{1n} \\ \\ L_h\frac{d}{dt}I_{hn} + R_hI_{hn} = U_{h-1,\,n} - U_{hn} \end{cases}$$

$$(9) \quad \begin{cases} I_{m,\,n-1} - I_{1n} = C_m\frac{d}{dt}U_{m,\,n-1} \\ \\ I_{hn} - I_{h+1,\,n} = C_h\frac{d}{dt}U_{hn} \end{cases}$$

Starting from these Systems (8 and 9) I obtain the System 10

$$(10) \quad \begin{cases} L_1\frac{d^2}{dt^2}I_{1n} + R_1\frac{d}{dt}I_{1n} = \frac{I_{m,n-1}-I_{1n}}{C_m} - \frac{I_{1n}-I_{2n}}{C_1} \\ \\ L_h\frac{d^2}{dt^2}I_{hn} + R_h\frac{d}{dt}I_{hn} = \frac{I_{h-1,n}-I_{hn}}{C_{h-1}} - \frac{I_{hn}-I_{h+1,n}}{C_h} \end{cases}$$

and assuming $$I_{hn} = A_h e^{kn+iwt}$$

said System (10) becomes $$(11) \quad \begin{cases} \left(-L_1w^2+R_1jw+\frac{1}{C_m}+\frac{1}{C_1}\right)A_1 - \frac{A_m}{C_m}e^{-k} - \frac{A_2}{C_1} = 0 \\ \\ \left(-L_hw^2+R_hjw+\frac{1}{C_{h-1}}+\frac{1}{C_h}\right)A_h - \frac{A_{h-1}}{C_{h-1}} - \frac{A_{h+1}}{C_h} = 0 \\ \\ \left(-L_mw^2+R_mjw+\frac{1}{C_{m-1}}+\frac{1}{C_m}\right)A_m - \frac{A_{m-1}}{C_{m-1}} - \frac{A_1}{C_m}e^k = 0 \end{cases}$$

This system comprises $m$ homogeneous equations in $A_1, A_2 \ldots A_m$. By writing that the determinant of the coefficients of said system is equal to zero I obtain an equation which generally is of the degree $2m$ in $w$, but which becomes of degree $m$ in $w^2$ if the resistances may be neglected ($R_1=R_2\neq \ldots R_m=0$). On the other hand said equation is quadratic in $e^k$.

For determining the passing bands, I must determine the values of $w$ between which $k$ is an imaginary expression, $k=jb$.

In the most general case the calculation should be very complicated; at first it is possible to neglect the resistances and determine by approximation the values $w_1w_2 \ldots$ and $w_{o2}$, $w_{o3}$ etc. ... of $w$ which are a solution of the equation wherein $b$ is assumed to be equal to 0 or $\pm\pi$.

Figure 13:
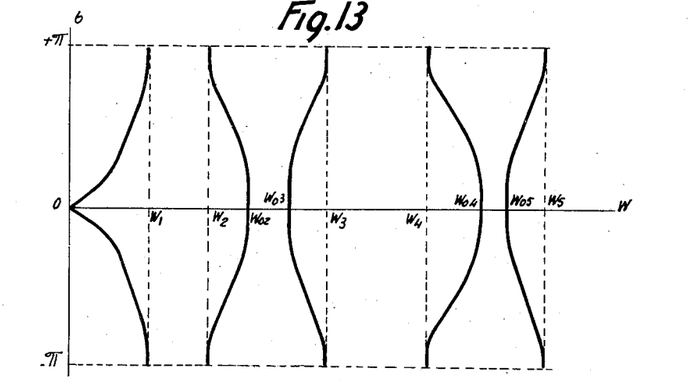
Figure 13 is a diagram corresponding to that of Figure 9 in the case of the general line represented in Figure 7.

I obtain so $m$ passing bands and the curve corresponding to that of Fig. 9 is now as plotted in Fig. 13, the inductances and capacities constituting the elements of the section being assumed to differ not very much from one another.

It has hitherto been assumed that the resistance, inductance and capacity of the line were located in one point instead of being distributed therealong; so the line has been assimilated to a network. It should be moreover possible to employ such devices designed according to the invention, as networks, filters or the like.

Figures 31, 32:
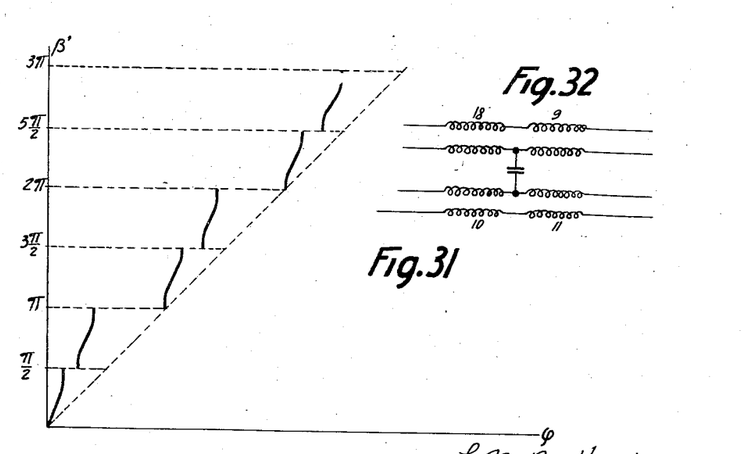
Figure 31 illustrates the distribution of bands in a certain line.
Figure 32 corresponds to Figure 11 for a line loaded with quadripoles.

The above described devices could be applied by substituting a part of line to an element comprising a resistance, an inductance coil and a condenser; said part of line being, if necessary, loaded with an inductance coil. By way of example, instead of the device corresponding to Figures 9 and 11 it should be possible to use a device like that illustrated in Fig. 12; the coils such as 18, 9, 10 and 11 being coupled with the coils inserted in the line as shown in Fig. 32.

In order to examine more completely the question, we must now apply to the parts of line comprised in a section the well known propagation equations.

If we call U and I the potential and current at a point of the line located at a distance $x$ from the end we have:

(12) $\begin{cases} U = Ae^{Px} + Be^{-Px} \\ I = \dfrac{-A}{Z}e^{Px} + \dfrac{B}{Z}e^{-Px} \end{cases}$ Z being the so called initial sending end impedance given by the formula $$Z = \sqrt{\frac{R' + jwL'}{G' + jwC'}}$$

wherein R' L' G' and C' are the resistance, inductance, dielectric conductance and capacity per unity of length of the line. P is the propagation constant and may be written $\alpha+j\beta$, $\alpha$ and $\beta$ being given by the well known formulae.

For high frequencies we have approximately $$Z = \sqrt{\frac{L'}{C'}} \quad \beta = w\sqrt{L'C'} \quad \alpha = \frac{R'}{2}\sqrt{\frac{C'}{L'}} + \frac{G'}{2}\sqrt{\frac{L'}{C'}}$$

Practically the insulation is always high enough for allowing G' to be neglected.

Figures 14, 15:
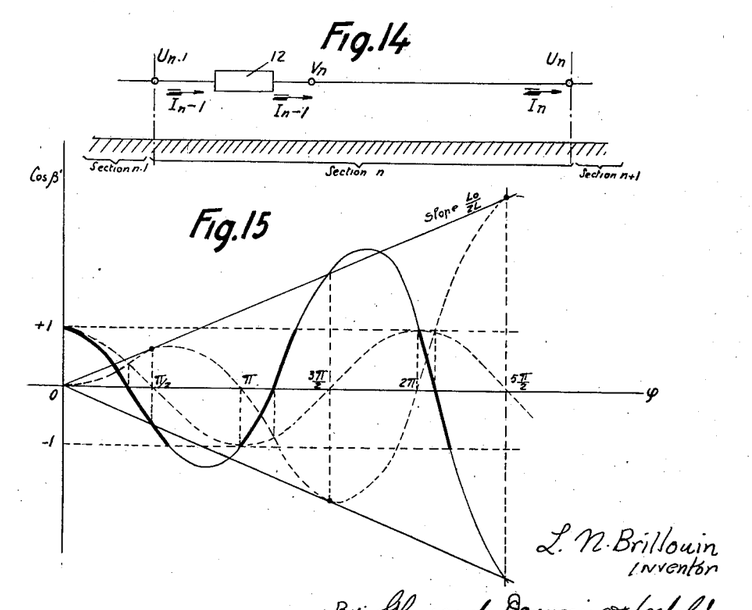
Figure 14 shows diagrammatically a section of a line consisting in a length of cable loaded at its end by an impedance, said cable being supposed to present uniformly distributed characteristics.
Figures 15 and 16 are curves showing the distribution of bands in a line like that of Figure 14.

I will now examine the peculiar case of a section constituted by a part of line of length X, loaded at one of its ends with a complex impedance; the section $n$ of said line is illustrated diagrammatically in Fig. 14, wherein 12 is the complex impedance, which shall be assumed to be a dipole without attenuation, viz: the impedance of which is an imaginary expression $z=jz'$.

The currents at the ends of the line shall be termed $I_{n-1}$ and $I_n$, and the potentials $U_{n-1}$ and $U_n$, the potential at the output terminal of the dipole 12 being called $V_n$.

Let us call $A_n$ and $B_n$ the constant coefficients corresponding to section $n$; by applying the Equation (12) to the ends of the line wherein X is equal either to 0 or to X; we obtain:

(13) $\begin{cases} V_n = A_n + B_n \\ ZI_{n-1} = -A_n + B_n \end{cases}$ (14) $\begin{cases} U_n = A_n e^{PX} + B_n e^{-PX} \\ ZI_n = -A_n e^{PX} + B_n e^{-PX} \end{cases}$ on the other hand we have (15) $\qquad U_{n-1} - V_n = zI_{n-1}$ Since the sections are all identical to one another, when passing from a section to the next one, the potentials and currents are multiplied by $e^k$, so starting from the Equations (14) we may write (16) $\begin{cases} U_{n-1} = U_n e^{-k} = A_n e^{-k+PX} + B_n e^{-k-PX} \\ ZI_{n-1} = ZI_n e^{-k} = -A_n e^{-k+PX} + B_n e^{-k-PX} \end{cases}$ If we compare the second of Equations (16) with the second of Equations (13) we obtain $$-A_n + B_n = -A_n e^{-k+PX} + B_n e^{-k-PX}$$

or (17) $\qquad A_n[1 - e^{-k+PX}] = B_n[1 - e^{-k-PX}]$

In the same way if we compare the Equation (15) to the first equations of Systems (13) and (16) we see that said Equation (15) becomes $$[A_n e^{-k+PX} + B_n e^{-k-PX}] - A_n - B_n = \frac{z}{Z}(-A_n + B_n)$$

or (18) $\qquad A_n\left[e^{-k+PX} - 1 + \frac{z}{Z}\right] = B_n\left[e^{-k-PX} + 1 + \frac{z}{Z}\right]$ By exterminating $A_n$ and $B_n$ from the Equations (17) and (18) we obtain a quadratic equation in $e^k$ the roots of which are (19) $\quad e^k = \cosh PX + \dfrac{z}{2Z}\sinh PX \pm$ $$\sqrt{\left(\cosh PX + \frac{z}{2Z}\sinh PX\right)^2 - 1}$$

When the frequencies are rather low the case is substantially similar to that of lines with non-distributed characteristics, viz: of networks; consequently I will examine only the case of high frequencies.

If the resistances are small and the insulation high, $\alpha$ may be neglected and I may write $$PX = j\beta X = j\varphi$$

with (20) $\qquad \varphi = \beta X = \dfrac{2\pi X}{\lambda} = wX\sqrt{L'C'} = w\sqrt{LC}$ $\lambda$ being the wave length of the oscillations on the unloaded line and $\varphi$ the shifting of said wave when it has travelled along the section of line X. It has been already assumed that $z$ is an imaginary expression $z=jz'$ and as stated above it is possible to admit $$Z = \sqrt{\frac{L'}{C'}}$$

and consequently Z is a real quantity.

The Equation (19) may then be written (21) $\quad e^k = \cos\varphi - \dfrac{z'}{2Z}\sin\varphi \pm$ $$j\sqrt{1 - \left(\cos\varphi - \frac{z'}{2Z}\sin\varphi\right)^2}$$

I shall have passing bands when $$e^k = e^{j\beta'} = \cos\beta' + j\sin\beta'$$

$\beta'$ being then the coefficient corresponding to the loaded line.

We must now examine two cases

1. $\left|\cos\varphi - \dfrac{z'}{2Z}\sin\varphi\right| \leq 1$ $\beta'$ is then given by its cosinus (22) $\qquad \cos\beta' = \cos\varphi - \dfrac{z'}{2Z}\sin\varphi$ And there shall exist a passing band between the values of $w$ for which $\cos\beta'$ is comprised between $-1$ and $+1$.

2. $\left|\cos\varphi - \dfrac{z'}{2Z}\sin\varphi\right| > 1$

In said case the square root of Formula (21) is an imaginary expression and consequently $e^k$ is a real quantity, attenuation shall always take place and the oscillations cannot pass.

I may now examine the peculiar case of an ordinary loaded line, the dipole 12 of Fig. 14 is then constituted only by an inductance coil of value $L_0$ and thus $z' = wL_0$.

On the other hand we have approximately $$Z = \sqrt{\dfrac{L'}{C'}} = \sqrt{\dfrac{L}{C}}$$

wherein L and C are the total inductance and capacity of the line, I conclude therefrom $$\sqrt{C} = \dfrac{\sqrt{L}}{Z}$$

and by consideration of Equation (20) I obtain $$\varphi = w\sqrt{LC} = w\dfrac{L}{Z} \text{ hence } Z = \dfrac{wL}{\varphi}$$

and consequently I may then write the Equation (22) as follows (23) $\qquad \cos\beta' = \cos\varphi - \dfrac{L_o}{2L}\varphi\sin\varphi$ I must now determine the regions wherein $\beta'$ is a real quantity; therefore I will plot the curve representing $\beta'$ against $\varphi$. It is easy if I plot at first the curves $\cos\varphi$ and $$\dfrac{L_o}{2L}\varphi\sin\varphi$$

indicated in dotted lines in Fig. 15; I obtain then the curve representing $\cos\beta'$; I have drawn it in solid line, the parts corresponding to real values of $\beta'$, viz: comprised between the ordinates $-1$ and $+1$, have been drawn in reinforced lines.

Besides we must remember that $\varphi$ is proportional to $w$, because of Equation (20) which gives $$\varphi = w\sqrt{LC}$$

But, in order to simplify, I thought better when examining the case to employ $\varphi$ as variable quantity; there is no difficulty for passing from $\varphi$ to the pulsation $w$ and thence to the frequency.

Figure 16:
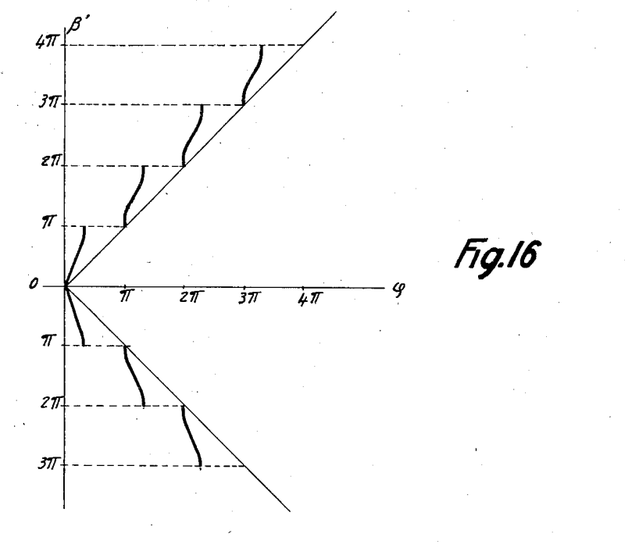

Instead of the curve of Fig. 15 illustrating $\cos\beta'$ I may plot the curve illustrating $\beta'$ against $\varphi$ as shown in Fig. 16.

The passing from one figure to the other is easy and needs no explanations.

It should be possible to transform in other ways the curves of Fig. 16 and those of the further figures, which are moreover given only as explanatory diagrams, since $\beta'$ is determined by its cosinus, we may for each value of this latter admit for $\beta'$ values such as $\beta' \pm 2N\pi$, it should thus be possible to extend throughout the whole plane the parts of curve drawn in Fig. 16, but I have thought that the present form was the best.

The necessary condition for a passing band being adapted for use in telephony is that said band has a width sufficient for carrying the modulated waves; if said band was too narrow it could be nevertheless used for transmission of conventional signals such as telegraphic ones.

In the case of the ordinary loaded line which has been examined above there is a low frequency passing band which presently is the only one to be used and high frequency bands comprised between:

$$\varphi_1 = N\pi \text{ and } \varphi_2 = N\pi + \epsilon$$

values for which we have $$\beta'_1 = N\pi \text{ and } \beta'_2 = (N+1)\pi$$

If I assume that, as it is practically the case, the load $L_0$ is much greater than the inductance $L$ of the line, $$\dfrac{L_o}{2L}$$

has a high value and I may determine $\epsilon$ in the following way, we have $$\cos\varphi_2 = \cos N\pi \cos\epsilon - \sin N\pi \sin\epsilon = \left(1 - \dfrac{\epsilon^2}{2}\right)\cos N\pi$$

and $$\cos\beta'_2 = \cos(N+1)\pi = -\cos N\pi$$

therefore according to the Equation (23)

$$-\cos N\pi = \left(1 - \dfrac{\epsilon^2}{2}\right)\cos N\pi - \dfrac{L_o}{2L}(N\pi + \epsilon)\epsilon\cos N\pi$$

or $$-1 = 1 - \dfrac{\epsilon^2}{2} - \dfrac{L_o}{2L}(N\pi\epsilon + \epsilon^2)$$

and neglecting the terms with $\epsilon^2$ I obtain $$\epsilon = \dfrac{4L}{L_o N\pi}$$

the width $\Delta w$ (in pulsation) of the passing band shall be therefore $$\Delta w = \dfrac{\epsilon}{\sqrt{LC}} = \dfrac{4}{L_o N\pi}\sqrt{\dfrac{L}{C}}$$

By way of numerical example I will now examine the cases of two lines presenting both sections of the same lengths and inductances say X = 1830 meters.
L = 1 millihenry.
C = 0.08 microfarad.

The velocity of propagation along the unloaded line would be almost 2/3 of light velocity, this line being loaded the first one with coils of 30 mh. and the second with coils of 7.7 mh.

The numerical results are tabulated as follows:

| N$^{rs}$ of the bands | 1 | 2 | 3 | 4 |
|---|---|---|---|---|
| Corresponding wave lengths in wireless telegraphy | 5000$^m$ | 2750$^m$ | 1833$^m$ | 1375$^m$ |
| width $\Delta w$ for L=30 mh. | 4700 | 2350 | 1570 | 1175 |
| width $\Delta w$ for L=7.7 mh. | 20,000 | 10,000 | 6667 | 5000 |

The consequence is that with loading coils of 30 mh. the high frequency bands are too narrow for being used in telephony, while with coils of 7.7 mh. the first high frequency band could be employed therefor.

In order to obtain a line on which a plurality of high frequency passing bands could be used in telephony with ordinary loads, it is thus necessary to employ a line according to the invention, viz: constituted by a plurality of sections all identical to one another, each of which comprises one or more parts of lines the lengths of which are or are not equal to one another, and one or many complex impedances identical to, or different from one another Equation (22)

$$\cos \beta' = \cos \varphi - \frac{z'}{2Z} \sin \varphi$$

shows that for any value of $\varphi$ (consequently of the frequency) for which $z'$ becomes equal to zero, $\beta'$ has the real value $\beta' = \varphi$.

Thus passing bands shall exist around said values of $\varphi$ and so I must in each case calculate the values of $w$, or $\varphi$, for which $z'$ becomes null.

Figures 17, 18, 19:
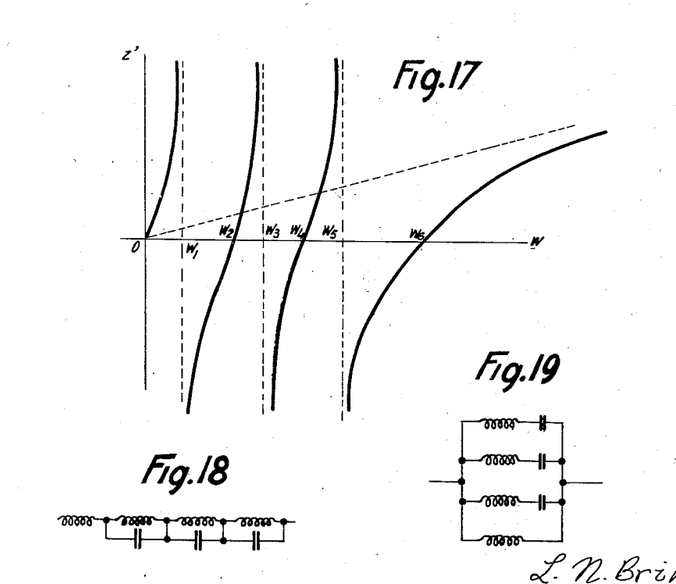
Figure 17 is a curve showing the impedance of a dipole plotted against the pulsation.
Figures 18 and 19 show dipoles corresponding to such curves.

Now the curve representing the values of the impedance $z'$ of a dipole against $\varphi$ is, in the most general case, shaped as shown in Fig. 17, said impedance becomes infinite for values $w_1$, $w_3$, $w_5$ etc. ... and null for values $w_2$ $w_4$ etc. ... of the pulsation, the curve ending in an asymptotic part.

Such dipoles may be built up in the known forms illustrated in Figs. 18 and 19, and also in many other forms where some circuits are connected in series and others in parallel.

For the values $w_1$ $w_3$ ... the term $$\frac{z'}{2Z}$$

is infinite $\beta'$ is an imaginary expression and no propagation can take place.

Contrarily, for pulsation $0_1$ $w_2$ $w_4$ etc. ... $z'=0$ and $\beta'=\varphi$, so there exists a passing band; if I take as coordinates $\beta'$ and $\varphi$ the points $\beta'=\varphi$ are located on the bisecting line of the axes; as they are also in the inner of a passing band the place of these latter is immediately visible.

Figure 20:
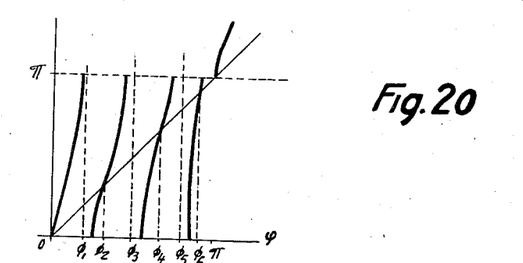
Figures 20 and 21 illustrate the distribution of the bands in a line loaded with a dipole having an impedance curve like that of Figure 17.
Figure 21:
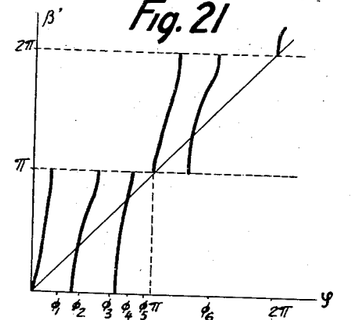

In the case of the dipole corresponding to Fig. 17, if the values $\varphi_2$ $\varphi_4$ $\varphi_6$ corresponding to $w_2$ $w_4$ and $w_6$ are smaller than $\pi$, I shall have, as shown in Fig. 20, four low and medium frequency passing bands corresponding to said values and further high frequency bands corresponding to $\varphi=N\pi$. Contrarily it might happen that $\varphi_4<\pi<\varphi_6$ and then I should have three low and medium frequency bands and an additional high frequency band as shown in Fig. 21.

Therefore it shall be possible with conveniently designed dipoles, to obtain as many passing bands as desired having suitable widths. It is obvious that the necessary condition for that width being at least equal to a minimum E is that for said band $$W_{2p+1} - W_{2p-1} > E$$

but said condition is not sufficient and the width of the bands must be calculated exactly in each special case.

Figure 22:
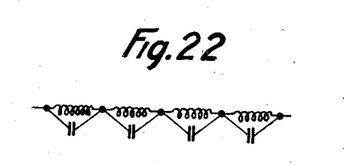
Figure 22 represents diagrammatically another dipole.
Figure 23:
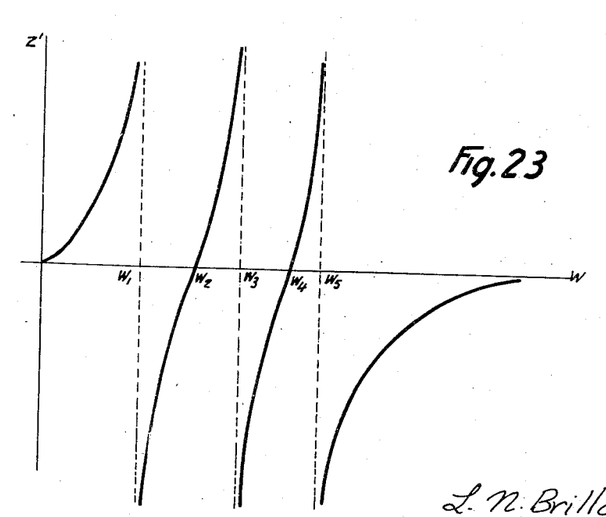
Figure 23 shows the variation of the impedance thereof.
Figure 24:
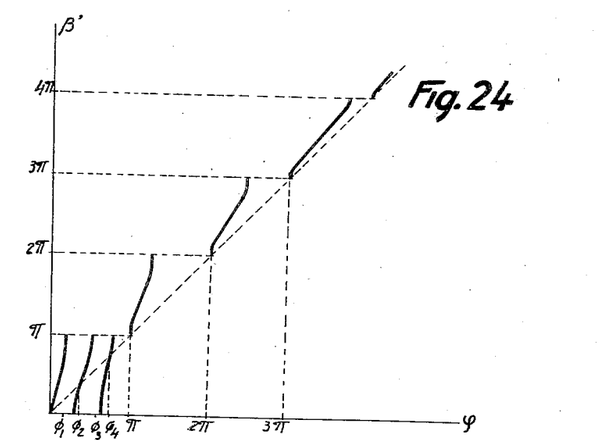
Figure 24 the distribution of bands in a line loaded therewith.

A more particularly interesting case is that when the impedance of the dipole tends towards zero when the frequency is infinitely increased, say the dipole of Fig. 22 the impedance curve of which is plotted in Fig. 23. It is easily seen that the curve giving $z'$ is shaped say as represented in Fig. 21, viz: shall have say three low and medium frequency bands and high frequency bands, these latter corresponding to parts of curve which draw nearer and nearer to the bisecting line of the $w$ axes of coordinates.

Such a disposition is advantageous if high frequency and specially very high frequency bands are to be employed, since said bands become very wide and almost join one another in a continuous manner.

Figures 25, 26, 27:
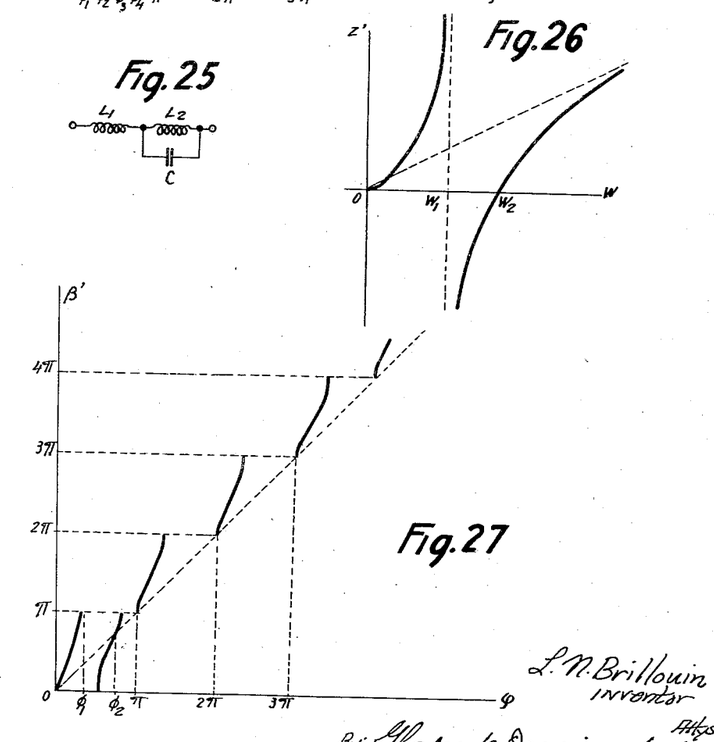

By way of example, I will examine here the case of a part of line connected with a dipole as represented in Fig. 25 and comprising two inductance coils ($L_1$ and $L_2$) in series, the second one being shunted by a condenser having a capacity C.

The impedance is given by the formula $$z^1 = L_1 w + \frac{L_2 w}{1 - L_2 C w^2}$$

which may be represented by the curve of Fig. 26 with $$w_1 = \frac{1}{\sqrt{L_1 C}}$$

$$w_2 = \sqrt{\frac{L_1 + L_2}{L_1 L_2 C}}$$

If I call $\varphi_1$ and $\varphi_2$ the values of $\varphi$ corresponding to said pulsations $w_1$ and $w_2$ the curve representing $\beta'$ against $\varphi$ is as illustrated in Fig. 27.

The high frequency bands are substantially of same width as those existing with a single inductance coil $L_1$, since for said high frequencies the coil $L_2$ is shortcircuited by the condenser C.

Contrarily in the low frequency band the condenser C plays no part and all goes as if it was dealt with an ordinary line loaded with coils having an inductance $L_1 + L_2$.

By instance if $L_1$ is small with reference to $L_2$, say $$L_1 + L_2 = 30 \; mh.$$

$$L_1 \leqq 8 \; mh.$$

The calculation results in:
1. An ordinary low frequency band;
2. A mean frequency band, corresponding to $\varphi_2$, and wide enough for being used for telephonic carrying waves;
3. A high frequency band corresponding to $\varphi = \pi$ and also wide enough for being used in telephony.

Thus each pair of wires shall be able to transmit three telephonic communications.

Instead of dipoles it is of course possible to use quadripoles inserted in the line, the calculations may be made in the same manner and give results similar to those above indicated; nevertheless a line passing out of the origin shall sometimes be substituted to the bisecting line of the axes, and the low frequency part of the curve shall pass by said origin only if direct current can pass through the dipole. It shall be possible to use the dipole in order to improve the transmission inside the low frequency passing band.

Figure 28:
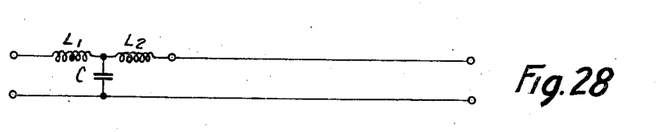
Figures 28 and 29 show 2 lines loaded with quadripoles.
Figure 29:
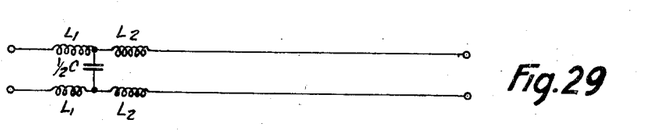
Figure 30:
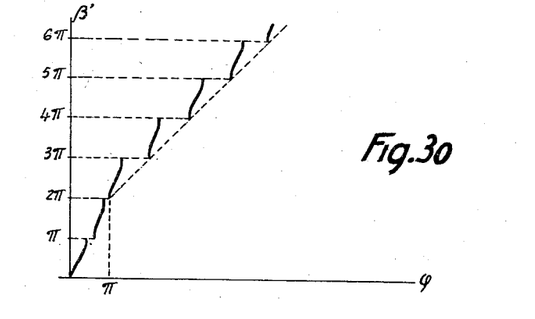
Figure 30 shows the distribution of bands in said lines.

For instance, for a section comprising at its end a dipole as represented in Figure 28 or in Figure 29, the complete discussion shows that if the pulsation W given by the equation $$(L_1 + L_2) C w^2 = 1$$

is not too high, we obtain passing bands as represented in Fig. 30.

As another example I may consider a section comprising two coils having different inductances and located the one at the end and the other at the medium point of the section, in other terms the line comprises two parts of equal lengths separated by inductance coils presenting alternatively and successively two different inductance values.

In said case the bands are as indicated in Fig. 31 which springs for Fig. 16, each part of curve being separated in two portions and displaced so that the starting points are no more all on the bisecting line. The two first parts of Fig. 31 give the two first parts of Fig. 9 by making $b=2\beta'$ and $b=2\beta'-\pi$ in said parts.

What I claim is:
1. A transmission line presenting several pass bands wide enough for allowing telephonic transmission, constituted by a plurality of sections all identical to one another, each section being constituted by at least one part of smooth line having distributed resistance, capacity, inductance and leakage conductance, and at least one lumped complex impedance inserted in series between said parts of smooth line, said parts of line and said impedances being so designed with regard to one another that the ratio between the currents entering into two successive sections being written in the form of $e^k$, $k$ is a purely imaginary expression when neglecting the resistances.

2. A transmission line presenting several pass bands wide enough and wherein the attenuation is low enough for allowing telephonic transmission, constituted by a plurality of sections all identical to one another, each section being constituted by one part of smooth line having distributed resistance, capacity, inductance and leakage conductance; a complex impedance inserted at each junction point between two successive parts of line; the part of smooth line of a section and the complex impedance at the ends thereof being so designed with regard to one another that the ratio between the currents entering into two successive sections being written in the form $e^k$, $k$ is a purely imaginary expression when neglecting the resistances.

3. A transmission line as claimed in claim 2 wherein the complex impedance consists in two groups of two inductance coils connected in series to each other each group being inserted in one of the wires of the line, and in a condenser connected between the junction points of the coils of each group; the inductance and capacity being so designed as to obtain a first pass band extending from frequency zero to a predetermined value allowing direct telephonic transmission, and a second pass band between higher frequencies allowing telephonic transmission by modulated carrier waves; a first system of two coils wound in the same direction, connected in series and coupled each with one of the inductance coils located at the end of the last section of the line for collecting the current of the low frequency band; and a second system of two coils wound in opposite directions and coupled each with one of the inductance coils located at the end of the last section of the line for collecting the current of the high frequency band.

4. A transmission line as claimed in claim 2 wherein the complex impedance is constituted so as to present an impedance equal to zero for different frequencies which are consequently inside the free transmission bands.

5. A transmission line as claimed in claim 2 wherein the complex impedance consists in two dipoles inserted in series on each of the wires of the line, each dipole being constituted by two inductance coils connected in series, one of which is shunted by a condenser.

LÉON NICOLAS BRILLOUIN.